United States Patent
Kim et al.

(10) Patent No.: US 8,923,368 B2
(45) Date of Patent: Dec. 30, 2014

(54) RADIO FREQUENCY TRANSCEIVER

(71) Applicant: Samsung Electronics Co. Ltd., Suwon-si (KR)

(72) Inventors: Ikgon Kim, Hwaseong-si (KR); Kihwa Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 13/693,378

(22) Filed: Dec. 4, 2012

(65) Prior Publication Data

US 2013/0148703 A1    Jun. 13, 2013

(30) Foreign Application Priority Data

Dec. 8, 2011  (KR) .................. 10-2011-0130793

(51) Int. Cl.
*H04B 1/38*  (2006.01)
*H04B 1/40*  (2006.01)
*H04B 1/00*  (2006.01)
*H04L 27/36*  (2006.01)

(52) U.S. Cl.
CPC ............... *H04B 1/40* (2013.01); *H04B 1/0057* (2013.01); *H04L 27/362* (2013.01)
USPC ..... 375/219; 375/267; 455/232.1; 455/226.2; 455/323

(58) Field of Classification Search
USPC ...................... 375/219, 295; 455/226.2, 232.1
See application file for complete search history.

(56) References Cited

U.S. PATENT DOCUMENTS

| | | | |
|---|---|---|---|
| 7,542,731 B2* | 6/2009 | Park et al. ........................ 455/84 |
| 8,417,192 B2* | 4/2013 | Brady et al. ..................... 455/73 |
| 2008/0139161 A1* | 6/2008 | Park et al. ...................... 455/323 |
| 2009/0075613 A1* | 3/2009 | Safarian et al. ............. 455/232.1 |
| 2011/0039509 A1* | 2/2011 | Bruchner ................... 455/232.1 |
| 2011/0223878 A1* | 9/2011 | Lin et al. .................... 455/226.2 |

\* cited by examiner

*Primary Examiner* — Eva Puente
(74) *Attorney, Agent, or Firm* — Jefferson IP Law, LLP (57) ABSTRACT

A radio frequency transceiver which can support various frequency conversion schemes is provided. The radio frequency transmitter includes a first low pass filter, a second low pass filter, a first filter input port connected to an input terminal of the first low pass filter, a second filter input port connected to an input terminal of the second low pass filter, a first filter output port connected to an output terminal of the first low pass filter, a second filter output port connected to an output terminal of the second low pass filter, an I/Q modulator, an I input port connected to an I input terminal of the I/Q modulator, a Q input port connected to a Q input terminal of the I/Q modulator; and a Radio Frequency (RF) output port connected to an output terminal of the I/Q modulator.

14 Claims, 6 Drawing Sheets

RADIO FREQUENCY TRANSCEIVER

PRIORITY

This application claims the benefit under 35 U.S.C. §119(a) of a Korean patent application filed on Dec. 8, 2011 in the Korean Intellectual Property Office and assigned Serial No. 10-2011-0130793, the entire disclosure of which is hereby incorporated by reference.

BACKGROUND OF THE INVENTION

1. Field of the Invention

The present invention relates to a radio frequency transceiver. More particularly, the present invention relates to a radio frequency transceiver which supports various frequency conversion schemes.

2. Description of the Related Art

A base station includes a transceiver according to a typical function. A radio frequency chipset included in the base station according to the related art supports a unique carrier rather than multi-carriers. The radio frequency chipset according to the related art has supported only a zero-Intermediate Frequency (zero-IF) frequency conversion scheme. The radio frequency chipset according to the related art cannot be utilized in a base station of using low-IF and digital-IF conversion schemes. When designing a radio frequency block, if a frequency conversion scheme is changed according to a standard specification and a bandwidth assigned to its provider, the radio frequency chipset must also be changed. If the frequency conversion scheme is changed, its transceiver board needs to be redesigned. In addition, the radio frequency chipset according to the related art does not have any feedback path for a Digital Pre-Distortion (DPD).

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a radio frequency transceiver which can be utilized in transceivers of various frequency conversion schemes such as Zero IF, Low IF, and Digital IF when designing a transceiver.

Aspects of the present invention are further to provide a radio frequency transceiver by which a design of a transceiver can be simplified through utilization of a radio frequency apparatus, the material cost can be reduced, and a Printed Circuit Board (PCB) can be used.

In accordance with an aspect of the present invention, a radio frequency transmitter is provided. The transmitter includes a first low pass filter, a second low pass filter, a first filter input port connected to an input terminal of the first low pass filter, a second filter input port connected to an input terminal of the second low pass filter, a first filter output port connected to an output terminal of the first low pass filter, a second filter output port connected to an output terminal of the second low pass filter, an I/Q modulator, an I input port connected to an I input terminal of the I/Q modulator, a Q input port connected to a Q input terminal of the I/Q modulator, and a Radio Frequency (RF) output port connected to an output terminal of the I/Q modulator.

In accordance with another aspect of the present invention, a radio frequency receiver is provided. The receiver includes a first low pass filter, a second low pass filter, a first filter output port connected to an output terminal of the first low pass filter, a second filter output port connected to an output terminal of the second low pass filter, a first filter input port connected to an input terminal of the first low pass filter, a second filter input port connected to an input terminal of the second low pass filter, an I/Q modulator; an I output port connected to an I output terminal of the I/Q modulator, an Q output port connected to an Q output terminal of the I/Q modulator, and an RF input port connected to an input terminal of the I/Q modulator.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
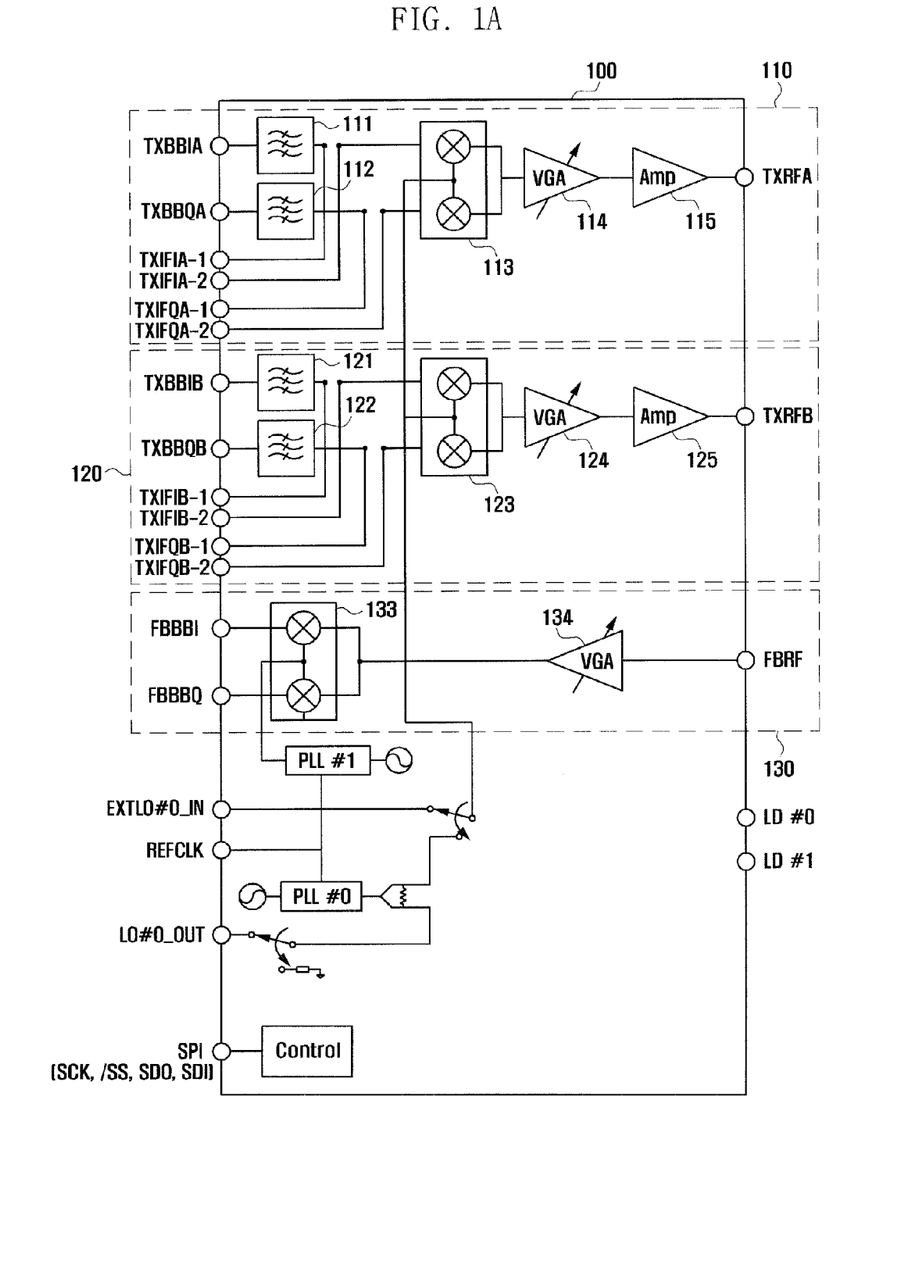
FIG. 1A is a view showing a configuration of a radio frequency transmitter according to a first exemplary embodiment of the present invention.

FIG. 1A is a view showing a configuration of a radio frequency transceiver according to a first exemplary embodiment of the present invention.

Referring to FIG. 1A, a radio frequency transmitter 100 may be implemented in a chip. Hereinafter, it is assumed that the radio frequency transmitter 100 is implemented in a chip. However, the radio frequency transmitter 100 may be miniaturized in another type.

The radio frequency transmitter 100 includes a first transmitter 110 and a second transmitter 120. The radio frequency transmitter 100 is provided for a base station having two transmission antennas. However, according to a modified exemplary embodiment, the radio frequency transmitter may include only the first transmitter 110. In this case, the radio frequency transmitter may be used for a base station having only one transmission antenna.

The radio frequency transmitter 100 includes a feedback path 130. However, according to the exemplary embodiment, the feedback path 130 may be omitted. In this case, the base station includes a feedback path which is implemented with a separate external device.

An exemplary embodiment is described below in which the radio frequency transmitter 100 includes the first transmitter 110, the second transmitter 120, and the feedback path 130.

The first transmitter 110 includes a first Low Pass Filter (LPF) 111, a second low pass filter 112, a first I/Q modulator 113, a first Variable Gain Amplifier (VGA) 114, and a first amplifier 115.

The first and second low pass filters 110 and 112 are low pass filters for Zero-Intermediate Frequency (IF) or Low-IF. A size of a digital-IF filter is greater than that of a low pass filter for zero-IF or low-IF, so that it may be difficult to integrate the digital-IF filter in a chip.

An input terminal of the first low pass filter 111 is connected to a first filter input port TXBBIA. An output terminal of the first low pass filter 111 is connected to a first filter output port TXIFIA-1. The first low pass filter 111 filters the signal input from the first filter input port TXBBIA and outputs the filtered signal to the first filter output port TXIFIA-1.

An input terminal of the second low pass filter 112 is connected to a second filter input port TXBBQA. An output terminal of the second low pass filter 112 is connected to a second filter output port TXIFQA-1. The second low pass filter 112 filters the signal input from the second filter input port TXBBQA and outputs the filtered signal to the second filter output port TXIFQA-1.

An I input terminal of the first I/Q modulator 113 is connected to a first I input port TXIFIA-2. A Q input terminal of the first I/Q modulator 113 is connected to a first Q input port TXIFQA-2. An output terminal of the first I/Q modulator 113 is connected to a first radio frequency output port TXRFA through the first VGA 114 and the first amplifier 115. The first I/Q modulator 113 modulates a signal received through the first I input port TXIFIA-2 and the first Q input port TXIFQA-2 and transmits the modulated signal to a first radio frequency output port TXRFA.

The first VGA 114 and the first amplifier 115 constitute an amplifier unit. One or both of the first VGA 114 and the first amplifier 115 may be omitted. In this case, an output terminal of the first I/Q modulator 113 is directly connected to the first radio frequency output port TXRFA. When one or both of the first VGA 114 and the first amplifier 115 is or are omitted, an external amplifier unit which is additionally provided may perform the amplifying function instead.

The second transmitter 120 has the same configuration as that of the first transmitter 110. The second transmitter 120 includes a third low pass filter 121, a fourth low pass filter 122, a second I/Q modulator 123, a second VGA 124, and a second amplifier 125. Since the configuration of the second transmitter 120 is the same as that of the first transmitter 110, the detailed description of the second transmitter 120 is omitted. The first radio frequency output port TXRFA outputs the signal to be output through the first antenna. As described above, the second transmitter 120 may be omitted.

The feedback path 130 includes a feedback input port FBRF, a third VGA 134, a feedback demodulator 133, an I output port FBBBI, and a Q output port FBBBQ. A feedback signal is input through the feedback input port FBRF, amplified by the third VGA 134, demodulated through the feedback demodulator 133, divided into the I signal and the Q signal, and output through the I and Q output ports FBBBI and FBBBQ.

The radio frequency transmitter 100 may further include a Phase Locked Loop (PLL) and a Local Oscillator (LO). The radio frequency transmitter 100 may include load ports LD #0 and LD #1, a clock port REFCLK, a controller, and an SPI port. Since the PLL, the LO, the load ports, the clock port, the controller, and the SPI port are equal or similar to those of the related art, the detailed descriptions will be omitted.

Various kinds of ports illustrated in FIG. 1A may be implemented as a pin mounted on, for example, a chip in which the radio frequency transmitter 100 is implemented.

Figure 1B:
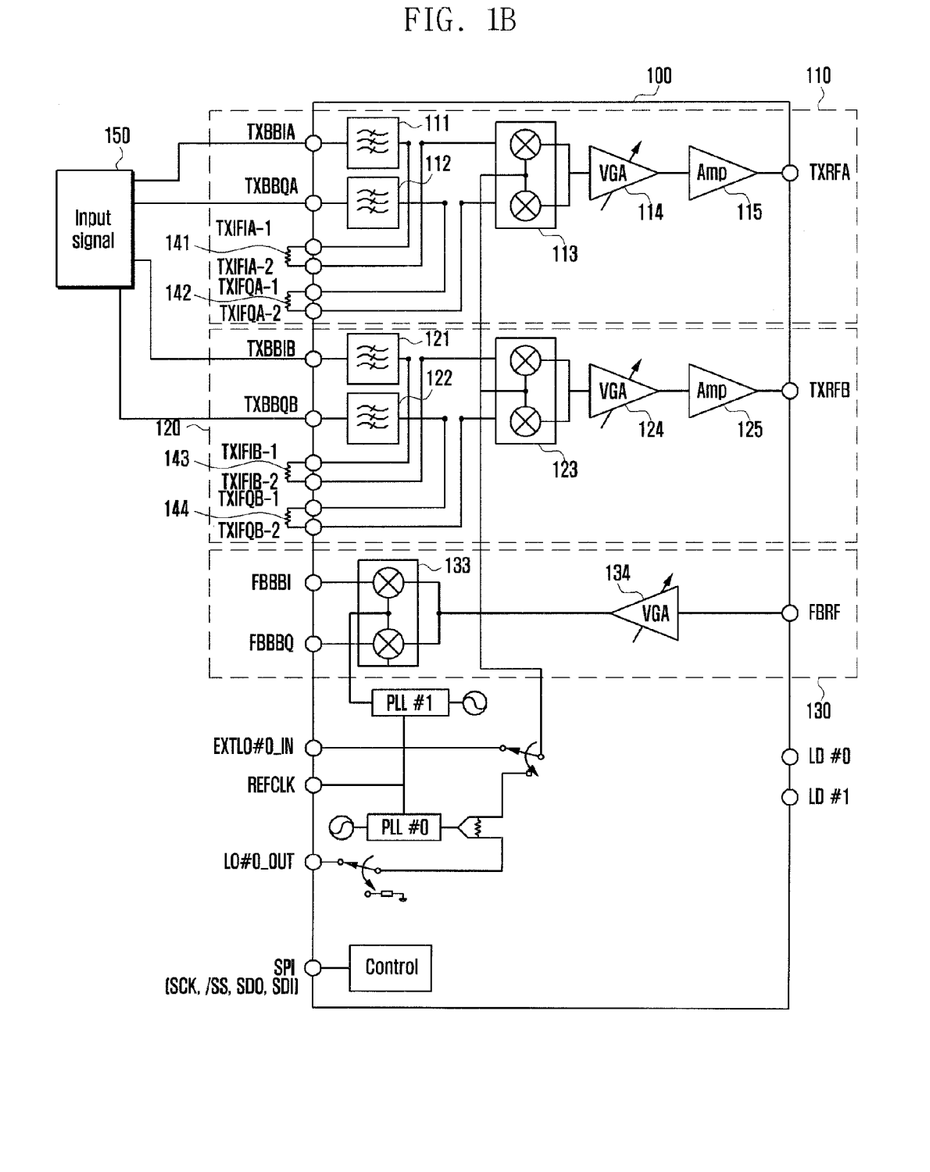
FIG. 1B is a view showing an example of a radio frequency transmitter according to a second exemplary embodiment of the present invention.

FIG. 1B is a view showing an example of a radio frequency transmitter according to a second exemplary embodiment of the present invention. In the exemplary embodiment of FIG. 1B, the radio frequency transmitter 100 may perform a zero-IF or low-IF transmission.

Referring to FIG. 1B, the input signal 150 output through the Digital-to-Analog (D2A) converter is input to the first filter input port TXBBIA, the second filter input port TXBBQA, the third filter input port TXBBIB, and the fourth filter input port TXBBQB.

The I signal for the first antenna is input to the first filter input port TXBBIA. The Q signal for the first antenna is input to the second filter input port TXBBQA. The I signal for the second antenna is input to the third filter input port TXBBIB. The Q signal for the second antenna is input to the fourth filter input port TXBBQB.

The first filter output port TXIFIA-1 is connected to the first I input port TXIFIA-2 through a resistor 141 of 0 ohm. The second filter output port TXIFQA-1 is connected to the first Q input port TXIFQA-2 through a resistor 142 of 0 ohm. The third filter output port TXIFIB-1 is connected to the first I input port TXIFIA-2 through a resistor 143 of 0 ohm. The fourth filter output port TXIFQB-1 is connected to the first I input port TXIFIA-2 through a resistor 144 of 0 ohm. In the above connections, another short-circuit scheme such as a connection using a Printed Circuit Board (PCB) pattern may be utilized instead of a resistor.

According to the connection shown in FIG. 1B, the input signal may be amplified by the amplifier unit via the low pass filters 111, 112, 121, and 122, and may be output through the radio frequency output ports TXRFA and TXRFB. As described above, the low pass filters 111, 112, 121, and 122 are for the zero-IF and the low-IF. Thus, according to the example shown in FIG. 1B, the transmission chip may support the zero-IF or the low-IF.

Figure 1C:
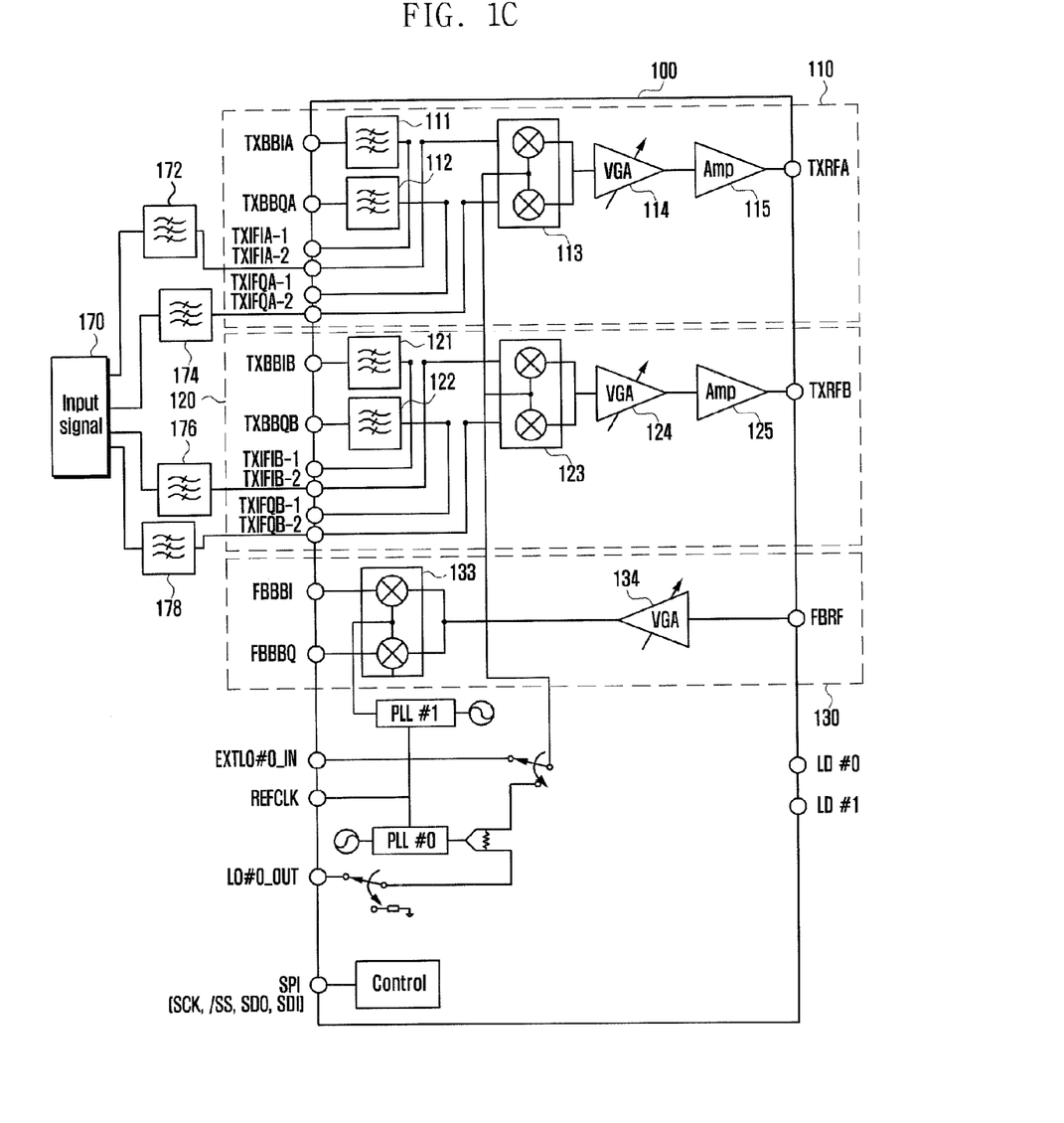
FIG. 1C is a view showing an example of a radio frequency transmitter according to a third exemplary embodiment of the present invention.

FIG. 1C is a view showing an example of a radio frequency transmitter according to a third exemplary embodiment of the present invention. In the exemplary embodiment of FIG. 1C, the radio frequency transmitter 100 may perform transmission of a digital-IF scheme.

Referring to FIG. 1C, the low pass filters 111, 112, 121, and 122 are not utilized. Instead, the input signal 170 output through the D2A convertor is filtered through external filters 172, 174, 176, and 178. The external filters 172, 174, 176, and 178 are for the digital-IF scheme. The filter for the digital-IF scheme is relatively large, so that it may be difficult to include the filter in the radio frequency transmitter 100. Thus the external filters 172, 174, 176, and 178 are implemented outside of the chip. The filtered signal may be modulated through the I/Q modulator 113 and 123, amplified by the amplifier unit, and output through the radio frequency output ports TXRFA and TXRFB. According to the exemplary embodiment of FIG. 1C, the transmission chip may support the digital-IF scheme.

If the same radio frequency transmitter 100 is manipulated, as shown in FIG. 1B, the radio frequency transmitter 100 may be utilized as the transmission chip supporting the zero-IF or the low-IF, and, as shown in FIG. 1C, the radio frequency transmitter 100 may be utilized as the transmission chip supporting the digital-IF scheme. According to free selection, the low pass filters included in the radio frequency transmitter 100 are utilized by exposing the output ports of the low pass filters and the input ports of the I/Q modulators, or by utilizing an external filter. Accordingly, although the IF mode is changed, the radio frequency transmitter 100 may be reused by amending a portion of the connections without changing the entire radio frequency transmitter 100.

Figure 2A:
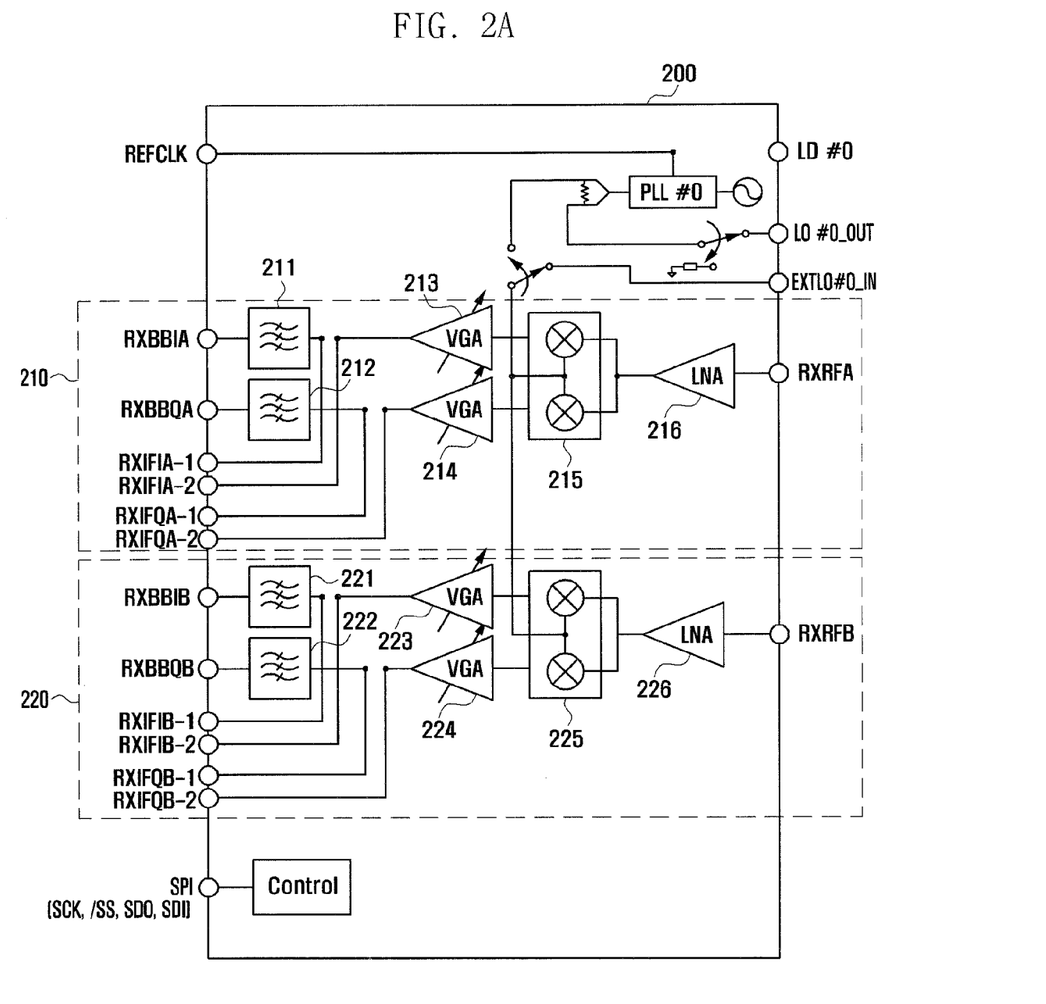
FIG. 2A is a view showing a configuration of a radio frequency receiver according to the first exemplary embodiment of the present invention.

FIG. 2A is a view showing a configuration of a radio frequency receiver 200 according to the first exemplary embodiment of the present invention Referring to FIG. 2A, the radio frequency receiver 200 may be implemented in a chip type. Hereinafter, it is assumed that the radio frequency receiver 200 is implemented in a chip. However, the radio frequency receiver 200 may be miniaturized in another fashion.

The radio frequency receiver 200 includes a first receiver 210 and a second receiver 220. The radio frequency receiver 200 is provided for a base station having two reception antennas. However, according to another exemplary embodiment, the radio frequency receiver may include only the first receiver 210. In this case, the radio frequency receiver may be used for a base station having only one reception antenna.

An exemplary embodiment is described below in which the radio frequency receiver 200 includes the first receiver 210 and the second receiver 220 will be described.

The first receiver 210 includes a first LPF 211, a second low pass filter 212, a first I/Q demodulator 215, a first VGA 213, a second VGA 214, and a first LNA 216.

The first and second low pass filters 211 and 212 are for Zero-IF or Low-IF. A size of a digital-IF filter is greater than that of a low pass filter for zero-IF or low-IF, so that it may be difficult to include the digital-IF filter in a chip.

An output terminal of the first low pass filter 211 is connected to a first filter output port RXBBIA. An input terminal of the first low pass filter 211 is connected to a first filter input port RXIFIA-1. The first low pass filter 211 filters the signal input from the first filter input port RXBBIA-1 and outputs the filtered signal to the first filter output port RXBBIA.

An output terminal of the second low pass filter 212 is connected to a second filter output port RXBBQA. An input terminal of the second low pass filter 212 is connected to a second filter input port RXIFQA-1. The second low pass filter 212 filters the signal input from the second filter input port RXIFQA-1 and outputs the filtered signal to the second filter output port RXBBQA.

An input terminal of the first I/Q demodulator 215 is connected to a first radio frequency input port RXRFA. An I output terminal of the first I/Q demodulator 215 is connected to a first I input port RXIFIA-2 through the first VGA 213. A Q output terminal of the first I/Q demodulator 215 is connected to a first Q output port RXIFQA-2 through the second VGA 214. The first I/Q demodulator 215 demodulates a signal received through the first radio frequency input port RXRFA, and outputs the I and Q signals to the first I output port RXIFIA-2 and the first Q output port RXIFQA-2, respectively.

The first VGA 213, the second VGA 214, and the first LNA 216 are amplifier units. At least one of the first VGA 213, the second VGA 214 and the first LNA 216 may be omitted. In this case, an input terminal, the I output terminal, and the Q output terminal of the first I/Q demodulator 215 may be directly connected to the first radio frequency input port RXRFA, and the first I and Q output ports RXIFIA-2 and RXIFQA-2. When at least one of the first and second VGAs 213 and 214 and the first LNA 216 is omitted, an external amplifier unit which is additionally provided may perform the amplifying function instead.

The second receiver 220 has the same configuration as that of the first receiver 210. The second receiver 220 may include a third low pass filter 221, a fourth low pass filter 222, a third VGA 223, a fourth VGA 224, a second I/Q demodulator 225, and a second LNA 226. Since the configuration of the second receiver 220 is the same as that of the first receiver 210, the detailed description of the second receiver 220 will be omitted. The signal of the first antenna is input through the first radio frequency input port RXRFA and the signal of the second antenna is input through the second radio frequency input port RXRFB. As described above, according to an exemplary embodiment, the second receiver 220 may be omitted.

The radio frequency receiver 200 may further include a phase locked loop and a local oscillator. Further, the radio frequency receiver 200 may include load ports LD #0, a clock port REFCLK, a controller, and an SPI port. Since the phase locked loop, the local oscillator, the load ports, the clock port, the controller, and the SPI port are equal or similar to those of the related art, the detailed descriptions will be omitted.

Various kinds of ports illustrated in FIG. 2A may be implemented as a pin mounted on, for example, a chip in which the radio frequency receiver 200 is implemented.

Figure 2B:
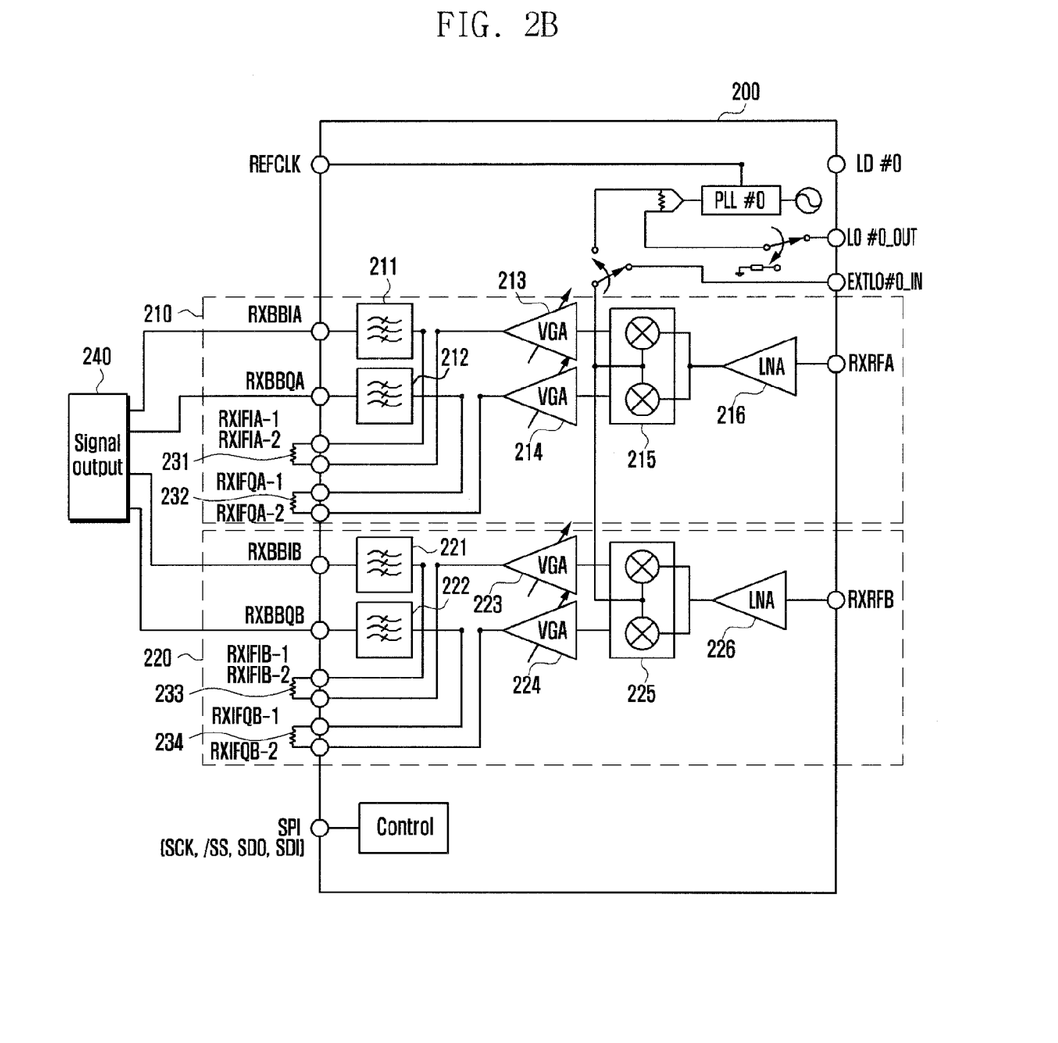
FIG. 2B is a view showing an example of a radio frequency receiver according to the second exemplary embodiment of the present invention.

FIG. 2B is a view showing an example of a radio frequency receiver according to a second exemplary embodiment of the present invention. In the exemplary embodiment of FIG. 2B, the radio frequency receiver 200 may perform a zero-IF or low-IF reception.

Referring to FIG. 2B, a radio frequency signal is demodulated by the I/Q demodulators through the LNAs 216 and 226. The demodulated I signal is amplified by the VGAs 213 and 223 and transferred to the low pass filters 211 and 212. The demodulated Q signal is amplified by the VGAs 214 and 224, and transferred to the low pass filters 221 and 222.

The first filter output port RXIFIA-1 is connected to the first I output port RXIFIA-2 through a resistor 231 of 0 ohm. The second filter input port RXIFQA-1 is connected to the first Q output port RXIFQA-2 through a resistor 232 of 0 ohm. The third filter input port RXIFIB-1 is connected to the second I output port RXIFIB-2 through a resistor 233 of 0 ohm. The fourth filter input port RXIFQB-1 is connected to the second Q output port RXIFQB-2 through a resistor 234 of 0 ohm. In the above connections, another short-circuit scheme such as a connection using a PCB pattern may be utilized instead of a resistor.

According to the connection of FIG. 2B, the radio frequency signal may be output through filter output ports RXB-BIA, RXBBIQ, RXBBIB, and RXBBQB via the I/Q demodulators 215 and 225 and the low pass filters 211, 212, 221, and 222. The signal 240 output through the output port is transferred to an A2D converter and is converted to digital signal. As described above, the low pass filters 211, 212, 221, and 222 are for the zero-IF and the low-IF. Thus, according to the example of FIG. 2B, a reception chip may support the zero-IF or the low-IF.

Figure 2C:
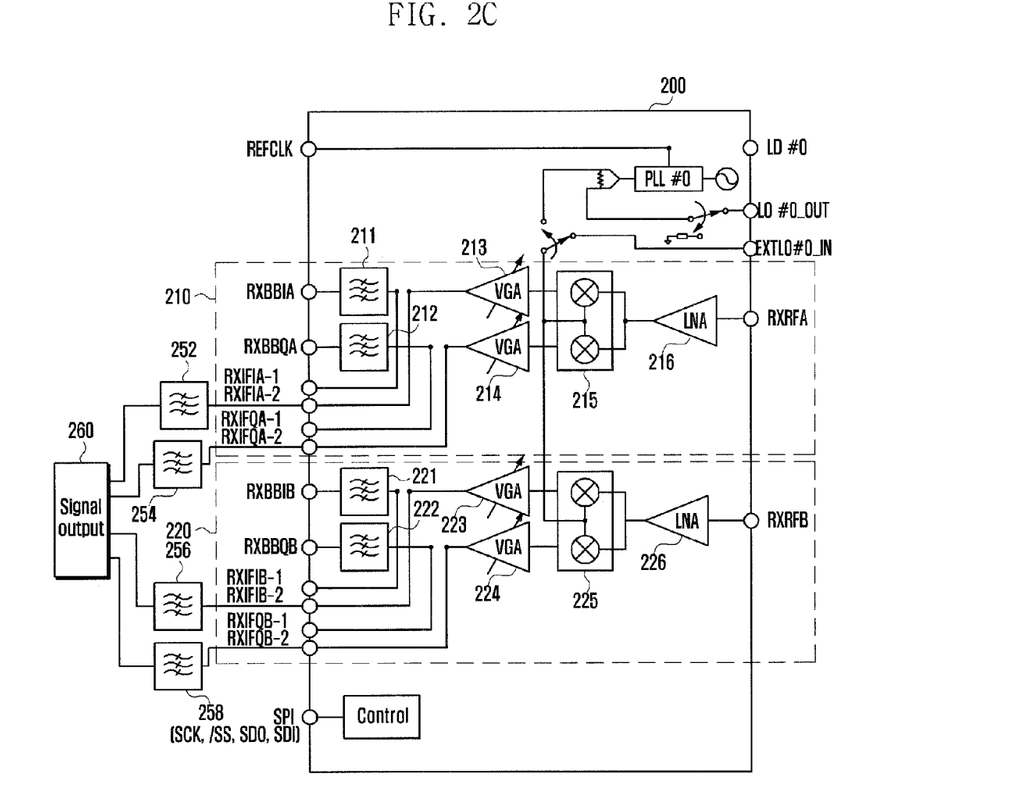
FIG. 2C is a view showing an example of a radio frequency receiver according to the third exemplary embodiment of the present invention.

FIG. 2C is a view showing an example of a radio frequency receiver according to a third exemplary embodiment of the present invention. In the exemplary embodiment of FIG. 2C, the radio frequency receiver 200 may perform reception in a digital-IF scheme.

Referring to FIG. 2C, the low pass filters 211, 212, 221, and 222 are not utilized. Instead, the signal output through the I/Q demodulator is filtered through external filters 252, 254, 256, and 258. The external filters 252, 254, 256, and 258 are for the digital-IF scheme. The filter for the digital-IF scheme is relatively large, so that it may be difficult to include the filter in the radio frequency receiver 200. Thus the external filters 252, 254, 256, and 258 are implemented outside of the chip. The filtered signal may be transferred to the A2D convertor and converted in a digital type. According to the exemplary embodiment of FIG. 2C, the reception chip may support the digital-IF scheme.

If the same radio frequency receiver 200 is manipulated, as shown in FIG. 2B, the radio frequency receiver 200 may be utilized as the transmission chip supporting the zero-IF or the low-IF, and, as shown in FIG. 2C, the radio frequency receiver 200 may be utilized as the transmission chip for the digital-IF scheme. According to free selection, the low pass filters included in the radio frequency receiver 200 are utilized by exposing the output ports of the low pass filters and the input ports of the I/Q demodulators, or an external filter may be utilized. Thus, although the IF mode is changed, the radio frequency receiver 100 may be reused by altering a portion of the connections without changing the entire radio frequency receiver 200.

It will be understood that each block depicted in the drawings showing processing flowcharts and those combination may be implemented by computer program instructions. The computer program instructions can be provided in a processor of a general-purpose computer, a special-purpose computer or other programmable data processing apparatus. The instructions executed by the processor of the computer or other programmable data processing device create means for implementing the functions specified in the flow block diagram. These computer program instructions may also be stored in a non-transitory computer-usable or computer-readable memory that can direct a computer or other programmable data processing apparatus to function in a particular manner. The computer program instructions stored in the computer-usable or computer-readable memory can produce an article of manufacture, including instructions that implement the functions specified in the blocks of the flowcharts. The computer program instructions may also be loaded onto a computer or other programmable data processing apparatus so as to cause a series of operational steps to be performed on the computer or another programmable apparatus. The computer program instructions executed on the computer or other programmable apparatus produce a computer-based process and thereby provide steps for implementing the functions specified in the blocks of the flowcharts.

Each block in the flowcharts may represent a part of modules, segments, or codes, which comprises one or more executable instructions for implementing the specified logical function(s). It should also be noted that in some alternative implementations, the functions noted in the blocks may occur out of order. For example, two blocks shown in succession may in fact be executed substantially and concurrently or the blocks may be executed in the reverse order, depending on the functionality involved.

As used herein, the term "~ unit" refers to software or a hardware structural element such as a Field Programmable Gate Array (FPGA) or Application Specific Integrated Circuit (ASIC), and the "~ unit" perform some roles. However, the "~ unit" is not limited to software or hardware. The "~ unit" can be configured to be stored in an addressable storage medium and to play at least one processor. Accordingly, for example, the "~ unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "~ units" may be engaged by the smaller number of structural elements and "~ units", or may be divided by additional structural elements and "~ units". Furthermore, structural elements and "~ units" may be implemented to play a device or at least one CPU in a security multimedia card.

According to exemplary embodiments of the present invention, the radio frequency transceiver is provided, which may be utilized in transceivers of various frequency conversion schemes such as Zero IF, Low IF, and Digital IF when designing a transceiver.

Further, according to exemplary embodiments of the present invention, by utilizing the radio frequency transceiver, a design of a transceiver may be simplified, the material cost may be reduced, and the Printed Circuit Board (PCB) may be used.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:
1. A radio frequency transmitter comprising:
a first low pass filter;
a second low pass filter;
a first filter input port connected to an input terminal of the first low pass filter;
a second filter input port connected to an input terminal of the second low pass filter;
a first filter output port connected to an output terminal of the first low pass filter;
a second filter output port connected to an output terminal of the second low pass filter;
an I/Q modulator;
an I input port connected to an I input terminal of the I/Q modulator;
a Q input port connected to an Q input terminal of the I/Q modulator; and a Radio Frequency (RF) output port connected to an output terminal of the I/Q modulator, wherein the I input port is connected to one of the low pass filters and an external filter for digital-Intermediate Frequency (IF) according of an operating mode of the radio frequency transmitter.

2. The radio frequency transmitter of claim 1, wherein the radio frequency transmitter is implemented as a chip, and the first filter input port, the second filter input port, the first filter output port, the second filter output port, the I input port, the Q input port, and the radio frequency output port are implemented as a pin mounted on the chip.

3. The radio frequency transmitter of claim 2, further comprising an amplifier unit arranged between the output terminal of the I/Q modulator and the radio frequency output port.

4. The radio frequency transmitter of claim 2, further comprising a feedback path provided on the chip.

5. The radio frequency transmitter of claim 2, wherein the first and second low pass filters are low pass filters for zero-Intermediate Frequency (IF) or a low-IF.

6. The radio frequency transmitter of claim 2, wherein, if the I input port is connected to the low pass filter through the first filter output port, the operating mode is that the radio frequency transmitter operates as a zero-Intermediate Frequency (IF) transmitter.

7. The radio frequency transmitter of claim 2, wherein, if the I input port is connected to the external filter, the operating mode is that the radio frequency transmitter operates as a digital-IF transmitter.

8. A radio frequency receiver comprising:
a first low pass filter;
a second low pass filter;
a first filter output port connected to an output terminal of the first low pass filter;
a second filter output port connected to an output terminal of the second low pass filter;
a first filter input port connected to an input terminal of the first low pass filter;
a second filter input port connected to an input terminal of the second low pass filter;
an I/Q modulator;
an I output port connected to an I output terminal of the I/Q modulator;
a Q output port connected to a Q output terminal of the I/Q modulator; and
a Radio Frequency (RF) input port connected to an input terminal of the I/Q modulator, wherein the I input port is connected to one of the low pass filters and an external filter for digital-Intermediate Frequency (IF) according to an operating mode of the radio frequency receiver.

9. The radio frequency receiver of claim 8, wherein the radio frequency receiver is implemented as a chip, and the first filter output port, the second filter output port, the first filter input port, the second filter input port, the I output port, the Q output port, and the radio frequency input port are implemented as a pin mounted on the chip.

10. The radio frequency receiver of claim 9, further comprising:
a first amplifier unit arranged between the I output terminal and the I output port of the I/Q modulator; and
a second amplifier unit arranged between the Q output terminal and the Q output port of the I/Q modulator.

11. The radio frequency receiver of claim 10, further comprising:
a third amplifier unit arranged between an input terminal of the I/Q modulator and the radio frequency input port.

12. The radio frequency receiver of claim 9, wherein the first and second low pass filters are low pass filters for zero-Intermediate Frequency (IF) or a low-IF.

13. The radio frequency receiver of claim 9, wherein, if the I output port is connected to the low pass filter through the first filter output port, the operating mode is that the radio frequency receiver operates as a zero-Intermediate Frequency (IF) receiver.

14. The radio frequency receiver of claim 9, wherein, if the I output port is connected to the external filter for digital-Intermediate Frequency (IF), the operating mode is that the radio frequency receiver operates as a digital-IF receiver.

\* \* \* \* \*